United States Patent [19]

Wong et al.

[11] Patent Number: 4,821,631
[45] Date of Patent: Apr. 18, 1989

[54] COOKING FOOD DEVICE

[76] Inventors: Henry Wong; Pen Weichou, both of 3704 Emily St., Kensington, Md. 20895

[21] Appl. No.: 183,935

[22] Filed: Apr. 20, 1988

[51] Int. Cl.$^4$ ............................................. A47J 27/00
[52] U.S. Cl. ...................................... 99/327; 99/332; 99/335
[58] Field of Search ................. 99/395, 396, 644, 331, 99/332, 325, 326, 339, 334, 390, 327, 352, 335, 348, 340, 409, 423, 427, 357, 443 R, 407; 426/523

[56] References Cited

U.S. PATENT DOCUMENTS

| | | | |
|---|---|---|---|
| 2,674,180 | 4/1954 | Ekman | 99/403 |
| 3,298,302 | 1/1967 | Fries | 99/443 X |
| 3,608,473 | 9/1971 | Kearn | 99/443 X |
| 3,688,684 | 9/1972 | Piedallu | 99/409 |
| 3,744,475 | 7/1973 | Myler et al. | 99/407 X |
| 3,870,193 | 3/1975 | Schneider | 99/427 X |
| 4,203,357 | 5/1980 | Vaussanvin | 99/340 |
| 4,550,757 | 5/1984 | Alfio | 99/327 |
| 4,561,346 | 12/1985 | Marquer | 99/348 |
| 4,594,941 | 6/1986 | Anderson | 99/407 X |
| 4,700,617 | 10/1987 | Lee et al. | 99/327 |
| 4,704,956 | 11/1987 | Gill | 99/427 |
| 4,719,850 | 1/1988 | Sowell | 99/407 X |

Primary Examiner—Harvey C. Hornsby
Assistant Examiner—K. O'Leary
Attorney, Agent, or Firm—Shlesinger & Myers

[57] ABSTRACT

A food cooking device for cooking Oriental dishes is disclosed comprising a base and a cooking pan support means pivoted to the base. An acceleration and deceleration means is provided for rapidly accelerating upwardly from a starting position to at least the rear portion of the support means at an initial high velocity followed by a subsequent rapid deceleration, whereby when the cooking pan is positioned on the support means, it will move upwardly with the support means and propel food placed therein into the air upon rapid deceleration of the support means, thereby causing the food to be turned for uniform heating of different portions of the food.

18 Claims, 3 Drawing Sheets

COOKING FOOD DEVICE

FIELD OF THE INVENTION

This invention relates to the field of cooking devices having stirring mechanism and particularly cooking devices suitable for cooking Oriental dishes requiring constant stirring.

BACKGROUND OF THE INVENTION

It is well known to those skilled in the art of cooking Oriental dishes such as Chinese food that constant stirring of the food being cooked is required to provide even cooking and to prevent overcooking. When preparing Chinese food, it is often common to use a cooking pan called a wok, which is an open top concave shaped fryinq pan. When using the wok, it is normal to constantly agitate it in a specific fashion to stir the food particles being cooked and to continually propel them into the air. The agitating motion requires years of practice to perfect and varies between cooks. It is not surprising that food prepared from the same recipe will not taste or look the same when prepared by different cooks largely because of the difference in the agitating motion that each cook imparts to the wok. Consistency in the food being cooked would be difficult to maintain. Different cooks will prepare the same food differently.

OBJECTS OF THE INVENTION

It is therefore an object of the invention to provide an automatic cooking device for preparing Oriental dishes, including Chinese food, that provides an automatic agitating and stirring to the food being cooked, and thus reduce the number of cooks normally needed when preparing large quantities of food such as for a restaurant.

It is another object of the invention to provide a cooking device that will provide substantially uniformly prepared food.

It is yet another object of the invention to prevent overcooking when preparing Oriental dishes.

It is still another object of the invention to prepare Oriental dishes with less experienced cooks.

A further object of this invention is to provide a working device which is inexpensive and easily manufactured.

It is a further object of the invention to cook food efficiently.

In summary, the invention will cook food uniformly, consistently and efficiently, making the operation of a Chinese fast food restaurant possible.

DETAILED DESCRIPTION OF THE INVENTION

Figure 1:
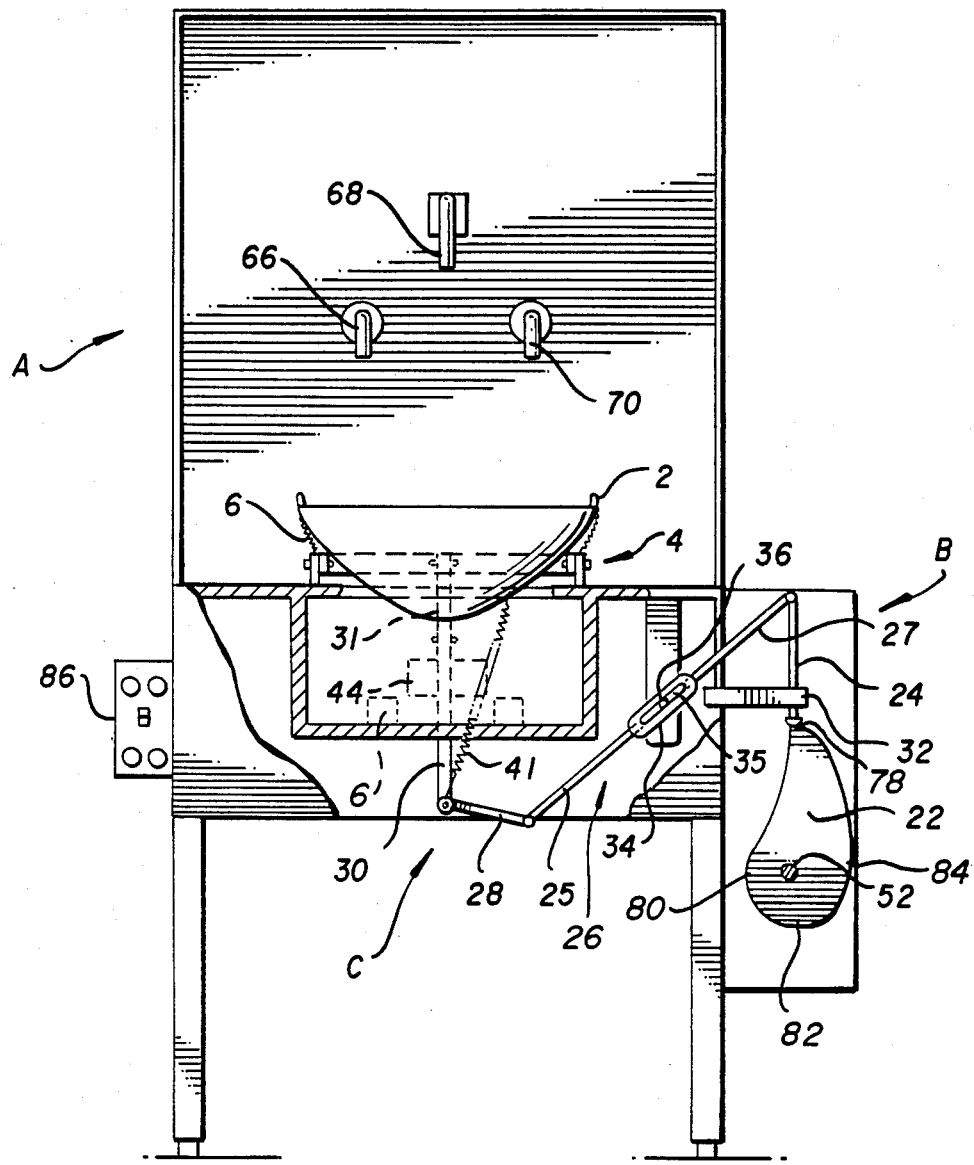
FIG. 1 is the front elevational view of the invention, showing the cooking pan and the linkage mechanism which converts the rotational motion of the cam to a vibratory motion and transmits the motion to the cooking pan.

Referring to FIG. 1, there is disclosed a cooking device comprising a base A, a pan holder 4 supporting a cooking pan 2, a stirring mechanism B, and a linkage mechanism C. Cooking pan 2 is shown as a wok which is an open top concave shaped frying pan, but it should be understood that it could be any open top cooking vessel. Cooking pan 2 is securely supported and detachably attached to the pa holder 4 by springs 6 at convenient locations along the rim of the cooking pan 2, pan holder 2 comprises a ring 8 having a smaller diameter than the rim of the cooking 2 and providing the support for the cooking pan 2. The pan holder 2 also comprises three parallel arms 10, 12 and 14 attached to the ring 8. Arms 10 and 12 are attached at tangent points 7 and 9 and extend toward the front. Arm 14 extends radially to the rear. Arms 10 and 12 are pivotally secured to the base A at pivots 16 and 18, allowing the pan holder 4 to move about an axis formed by pivots 16 and 18 in a circular arc. In another embodiment, as best shown in FIG. 5, arms 10 and 12 also include lost motion slot 9 while rotating about the pivots 16 and 18. The rear end of arm 14 is connected to the stirring mechanism B by means of pivot 45.

The stirring mechanism B comprises a cam 22, a cam follower 24 and a linkage mechanism C connecting the cam follower 22 to the pan holder 4. The cam 22 is substantially pear-shaped. The cam follower 24 slides vertically in a guide 32 between a higher and a lower limits of travel. The cam follower 24 rides over the edge of the cam 22 and transforms the rotary motion of the cam 22 into vertical oscillation. This oscillation is characterized by rapid acceleration and deceleration due in part to the action of the spring 41. The motion is transmitted by the linkage mechanism C to the pan holder 4 to stir and propel the food particles into the air. The linkage mechanism C comprises links 26, 28, 30 and 31 pivotally connected to each other in series. Link 26 further comprises links 25 and 27 having each a threaded end and joined together by a bar 34 having a lost motion slot 35 and a threaded hole at each end into which the threaded end of links 25 and 27 are screwed. The lost motion slot 35 engages a pin 36 rigidly attached to the base A, allowing the link 26 to slide in the lost motion slot 35 while rotating about the pin 36. The length of link 26 is adjustable by turning links 25 and 27 into or out of the bar 34. Link 30 slides vertically in a guide 44 in response to the motions of the cam follower 24 and the action of the spring 41. The spring 41 stretches and stores energy when link 30 moves downwardly and releases its stored energy when link 30 moves upwardly. Link 31 makes the final connection to the pan holder 4 by means of pivot 45. Links 30 and 31 should be configured such that when link 30 is at its most downward position, link 31 is angled to the right, as viewed in FIG. 2; and when link 30 is at its most upward position, link 31 substantially remains below the plane formed by the pan holder 4 and makes an angle with it.

Figure 4:
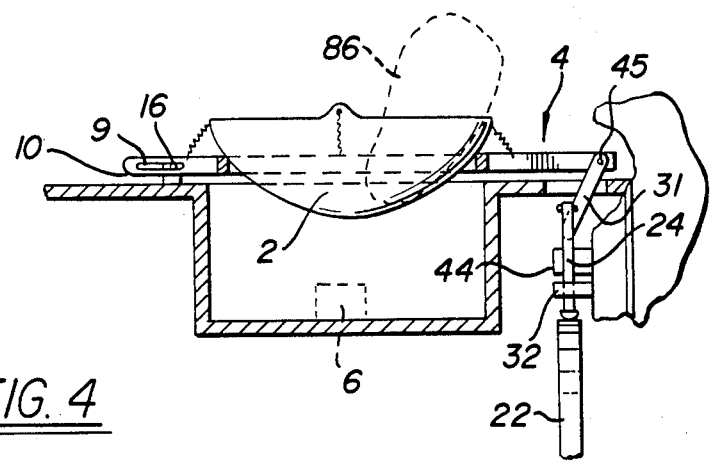
FIG. 4 shows another embodiment of the invention wherein lost motion slots are used in conjunction with the pivots in the pan holder.

In another advantageous embodiment of the invention, lost motions slot 9 are provided in arms 10 and 12 of the pan holder 4, as shown in FIG. 4. The extent of the lost motion slots 9 is related to links 30 and 31 such that when link 30 is at its most downward position, pivots 16 and 18 engage the slots 9 substantially at their right end as shown in FIG. 4; and when link 30 is at its most upward position, pivots 16 and 18 are at the vicinity of the left end of slots 9 and link 31 remains below the plane formed by pan holder 4 and makes an angle with it.

Figure 2:
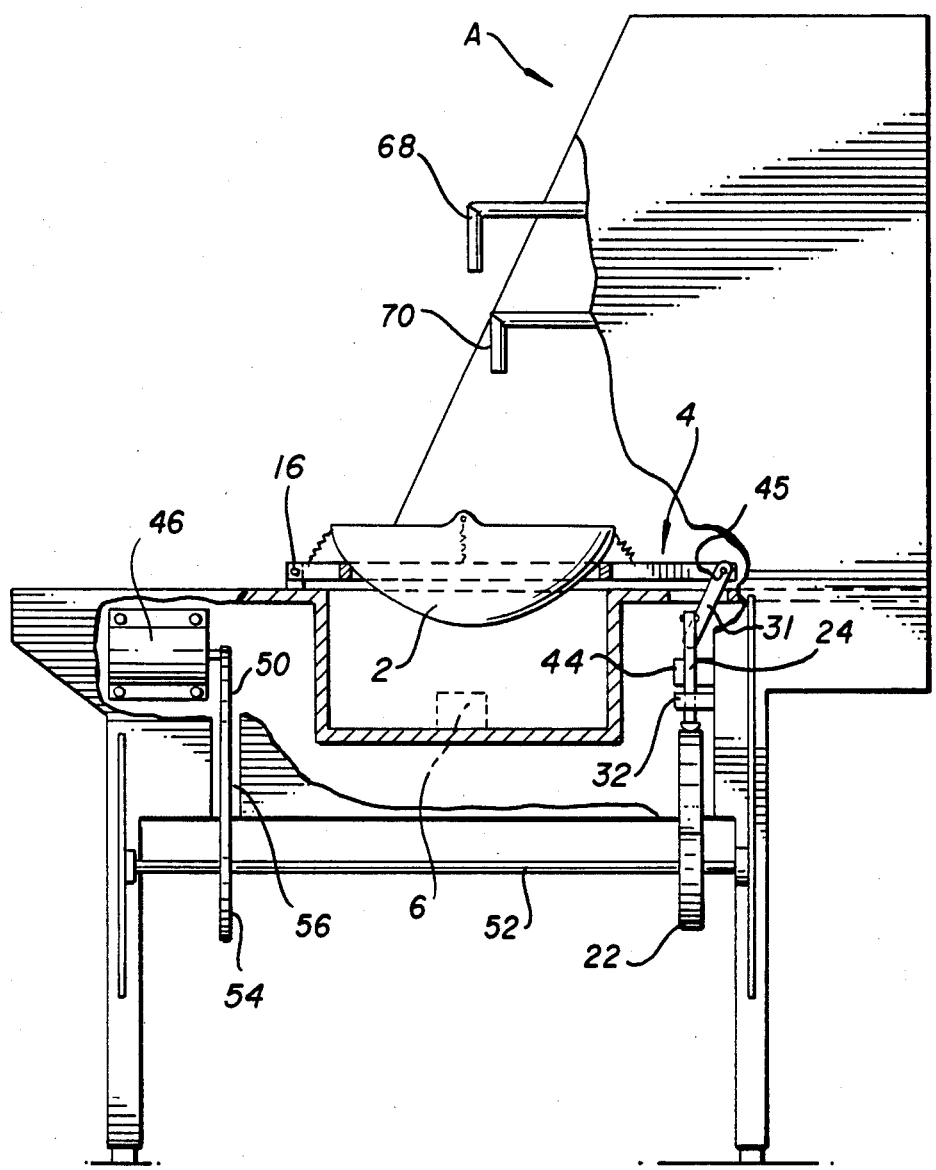
FIG. 2 is a side elevational view of the invention showing the pan holder pivoted at the front end and driven at the rear end by the linkage mechanism.
Figure 3:
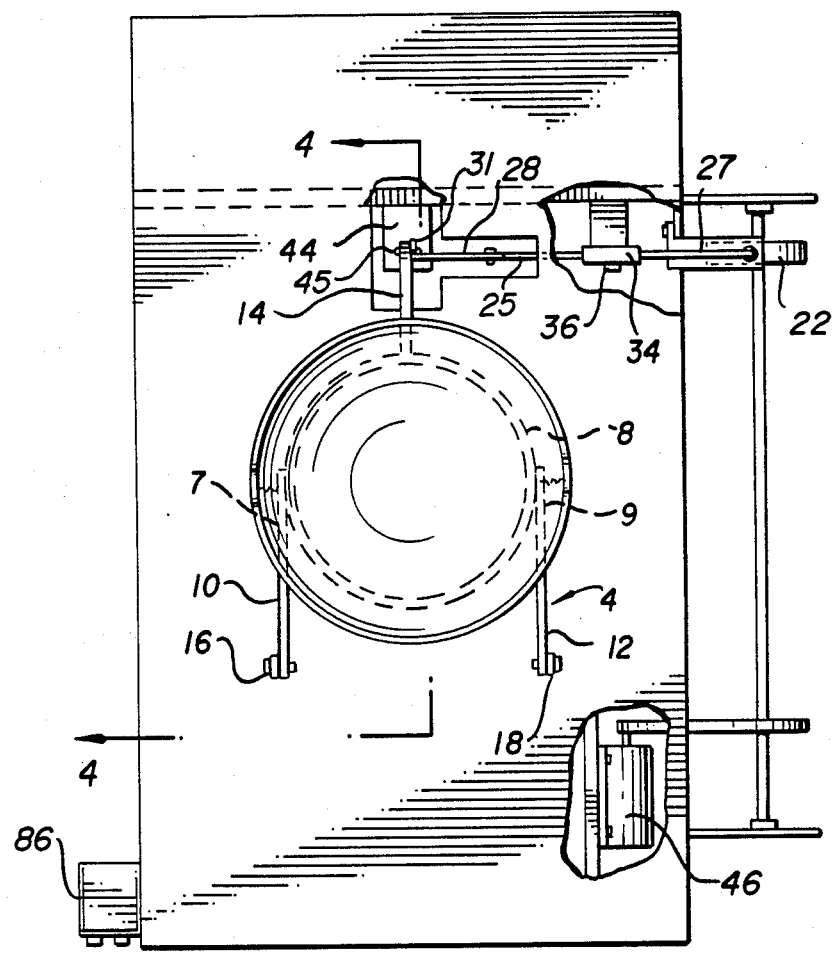
FIG. 3 is a top view of the invention.

Motor 46, as best shown in FIGS. 2 and 3, drives the cam 22 by means of the shaft 52 rotatably secured at its ends and rigidly connected to the cam 22 and a sprocket gear 54, which is rotated by a chain 56 and a sprocket gear 50 driven by the motor 46. Motor 46 is secured to the base A by conventional methods.

A burner 6 is advantageously positioned beneath the pan 2 to provide a source of heat for cooking the food in the pan 2. The burner 6 may be fueled by gas, electric, oil, wood or any other suitable fuel.

Liquid dispensing nozzles 66, 68 and 70 are provided to dispense cooking oil, water and sauce, respectively, during the cooking process. Water nozzle 6S is also used for washing the cooking pan 2 after each cooking. Liquid dispensing nozzles 66, 68 and 70 could be similar to that of a typical kitchen sink faucet where the nozzle could swivel from the base such that the cook could conveniently rotate any one of nozzles 66, 68 and 70 and direct the liquid most advantageously to a specific area of the cooking pan 2. Flexible tubes may also be adapted to the liquid dispensing nozzles 66, 68 and 70 for additional convenience of being able to direct the liquid stream in the proper direction. While a specific nozzle has been assigned to a specific fluid, it should be understood that the choice was arbitrary for convenience of reference and may be changed without any effect on the operation of the device.

Referring to FIG. 1, a controller 86, of conventional manufacture, having a timer function, controls the motor 46, the burner 6 and the liquid dispensing nozzles 66, 68 and 70. The controller 86 controls the speed of the motor 46 by increasing or reducing its speed than the normal speed, depending on the requirements of the recipe of the dish being cooked. The controller 86 also turns the motor on and off manually or automatically as dictated by the timer function. The controller 86 turns the burner on and off and modulates the heat output either manually or automatically when the timer function is activated. The liquid dispensing nozzles 66, 68 and 70 are controlled by the controller 86 either manually or automatically by the timer function. The timer function activates the controlled device, allow the device to remain activated for a preselected period of time and to deactivate the device after the lapse of the preselected period of time. For example, the controller 86 would activate the motor 46, let it run for a preset period of time and at the end of the period, deenergize the motor 46.

OPERATION

The functioning and working of the invention will now be described. Referring to FIG. 1 and to cam 22, points 78, 80, 82 and 84 are imaginary points on the cam 22 which are used as reference points for the following discussion. At the start of a stirring cycle, the pan holder 4 is resting in a horizontal position, link 30 is at its most downward position, spring 41 is under tension with stored energy, cam follower 24 is at its highest point relative to the cam 22, and the cam 22 presents the longest radial distance to the cam follower 24. Pan 2 is securely attached to the pan holder 4 by springs 6 such that the pan 2 stays secured to the pan holder 4 at all times. At the start of the cycle, the force on the stretched spring 41 is restrained by the cam follower 24 pressing against the cam 22 at point 78.

As the cam 22 moves clockwise and the cam follower relatively moves past the point 78 on the cam 22, the cam follower 24 is suddenly left in the air and not pressing on the cam 22 because of the unique shape of the cam 22 past the point 78, as best seen in FIG. 4. As a result, the spring 41 suddenly releases its stored energy and pulls link 30 upwardly with rapid acceleration through the vertical guide 44. Since the link 30 is operatively connected to link 31 which in turn is operatively connected to the pan holder 4 at pivot 45, as best shown in FIG. 2, this vertical motion of the link 30 causes the pan holder 4 and the pan 2 to rotate upwardly about the pins 16 and 18 with the same rapid acceleration as the link 30. As the link 30 is moving upwardly, the cam follower 24 is moving downwardly in the air toward the cam 22. The cam follower 24 makes contact with the cam 22 at about point 80. When the cam follower 24 hits the cam 22 at that point, the upward movement of the link 30 as it is pulled by the spring 41 is suddenly arrested with rapid deceleration and stops. The motion of the pan holder 4 and the cooking pan 2 is also immediately stopped. The rapid acceleration and deceleration of the pan 2 would cause the food inside the pan 2 to be thrown into the air, thus mixing it and promoting even cooking.

As the cam 22 continues to rotate clockwise from point 80 to point 84 relative to the cam follower 24, the radial distance between the cam 22 and the cam follower 24 substantially stays the same, keeping the pan holder 4 and the pan 2 in the upraised position. Finally, as the cam 22 moves back to the starting position 78 relative to the cam follower 24, the cam follower 24 moves upwardly and the link 30 moves downwardly, putting the spring 41 into tension and storing energy for the next cycle. The cycle is then repeated several times as necessary to cook the food.

In another advantageous embodiment of the invention, arms 10 and 12 of the pan holder 4 also include lost motion slots 9 as shown in FIG. 4. The lost motion slots cause the pan holder 4 and the pan 2 to trace a curve of increasing radii as the pan holder 4 slides through the pivots 16 and 18 in the lost motion slots 9 while it arches upward. As link 30 moves downwardly, the pan holder 4 and the pan 2 substantially retrace the curve. The lost motion slot 9 adds a lateral component to the circular arching oscillatory motion of the other embodiment and provides increased agitation and stirring. As best shown in FIG. 4, the food particles inside the cooking pan 2 would follow a substantially closed curve trajectory generally depicted in broken lines at 86. Food particles of various sizes and weights would follow different trajectories, but the trajectory indicated at 86 is typical.

By varying the speed of the motor 46, the acceleration and deceleration of the pan 2 may either be made more pronounced or made less abrupt by either increasing the speed or decreasing the speed of the motor 46, respectively. This type of control is best handled by the controller 86. Depending on the requirement of the recipe of the dish being cooked, the cook could simply preset a specific speed into the controller 86, for the motor 46.

During the cooking cycle, any one of the liquid dispensing nozzles 66, 68 and 70 may be activated to dispense a measured amount of oil, sauce or water to the dish being cooked. This is accomplished either manually or automatically through the controller 86.

After a cooking cycle is completed, the cook empties the cooking pan and cleans it with water from the water nozzle 68. Springs 6 securing the cooking pan 2 to the pan holder 4 are temporarily detached. The wash water is then dumped into a convenient drain (not shown). For the next cooking cycle, the springs 6 are reinstalled to secure the pan 2 to the pan holder 4.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

I claim:

1. A food cooking device for cooking Oriental dishes, comprising:
   (a) a base;
   (b) cooking pan support means having front and rear portions;
   (c) means for securing said support means to said base;
   (d) means for securing the pan to said support means;
   (e) acceleration and deceleration means for rapidly accelerating upwardly from a starting position at least said rear portion of said support means at an initial high velocity followed by a subsequent rapid upward deceleration to said rear portion of said support means;
   (f) whereby when the cooking pan is positioned on said support means, it will move upwardly with said support means and propel food placed therein into the air upon rapid upward deceleration of said support means, thereby causing the food to be turned for uniform heating of different portions of the food.

2. A food cooking device for cooking Oriental dishes, as in claim 1, wherein:
   (a) said acceleration and deceleration means includes means for bringing said support means for the cooking pan to the starting position after said support means is subjected to the rapid acceleration and deceleration.

3. A food cooking device for cooking Oriental dishes, as in claim 2, and further comprising:
   (a) cycling means for repeating the motion comprising rapid acceleration from the starting position followed by rapid deceleration and return to the starting position.

4. A food cooking device for cooking Oriental dishes, as in claim 3, wherein:
   (a) said cycling means includes cam means; and
   (b) rotation means for said cam means.

5. A food cooking device for cooking Oriental dishes, as in claim 5, wherein:
   (a) said cam means includes a cam follower.

6. A food cooking device for cooking Oriental dishes, as in claim 5, wherein:
   (a) said energy storage means includes spring means.

7. A food cooking device for cooking Oriental dishes, as in claim 4, wherein:
   (a) said linkage means includes energy storage means.

8. A food Cooking device for cooking Oriental dishes, as in claim 4, wherein:
   (a) said rotation means includes a motor.

9. A food cooking device for cooking Oriental dishes, as in claim 1, wherein:
   (a) said acceleration and deceleration means includes means for moving the cooking pan in a forward and upward direction.

10. A food cooking device for cooking Oriental dishes, as in claim 1, wherein:
    (a) said acceleration and deceleration means includes linkage means.

11. A food cooking device for cooking Oriental dishes, as in claim 1, wherein:
    (a) said cooking pan support means includes a ring and at least three arms extending from said ring.

12. A food cooking device for cooking Oriental dishes, as in claim 1, wherein:
    (a) said cooking pan support means is pivotally attached to said base.

13. A food cooking device for cooking Oriental dishes, as in claim 1, wherein:
    (a) the cooking pan is secured to said support means by spring means.

14. A food cooking device for cooking Oriental dishes, as in claim 1, and further comprising:
    (a) a burner means positioned beneath the cooking pan.

15. A food cooking device for cooking Oriental dishes, as in claim 1, and further comprising:
    (a) a liquid dispenser for dispensing liquids for cooking.

16. A cooking device for cooking Oriental dishes, as in claim 15, wherein:
    (a) said food cooking device includes control means for said acceleration and deceleration means; and
    (b) said control means controls said liquid dispenser.

17. A food cooking device for cooking Oriental dishes, as in claim 1, wherein:
    (a) said food cooking device includes control means for said acceleration and deceleration means.

18. A cooking device for cooking Oriental dishes, as in claim 1, wherein:
    (a) said means for providing forward and upward motion to the pan includes lost motion slots.

* * * * *